United States Patent [19]

Simokat

[11] 4,068,277
[45] Jan. 10, 1978

[54] OVERVOLTAGE PROTECTOR

[75] Inventor: Frank L. Simokat, Babylon, N.Y.

[73] Assignee: TII Corporation, Lindenhurst, N.Y.

[21] Appl. No.: 706,934

[22] Filed: July 19, 1976

[51] Int. Cl.² .............................................. H02H 3/22
[52] U.S. Cl. ........................................ 361/55; 361/56; 361/75; 361/105; 361/111; 361/124
[58] Field of Search .................... 361/55, 56, 71, 74, 361/75, 91, 103, 105, 111, 112, 124, 125; 317/16, 22, 31, 40 R, 50, 51, 66; 337/32

[56] References Cited

U.S. PATENT DOCUMENTS

| | | | |
|---|---|---|---|
| 3,312,889 | 4/1967 | Gold | 361/56 X |
| 3,353,066 | 11/1967 | DeSouza | 361/55 |
| 3,450,946 | 6/1969 | Camacho | 361/55 |
| 3,723,820 | 3/1973 | Brown | 361/75 X |

OTHER PUBLICATIONS

Silicon Zener Diode & Rectifier Handbook by Motorola, 1964, p. 27.

*Primary Examiner*—Harry E. Moose, Jr.
*Attorney, Agent, or Firm*—Morgan, Finnegan, Pine, Foley & Lee

[57] ABSTRACT

The disclosed protector comprises a three electrode gas tube overvoltage protector serially connected with a heating element, the combination being connected in shunt across the load to be protected. Between that protecting shunt path and the source, a normally closed switch is provided which is responsive to the heating element and opens in the event of a sustained overvoltage condition. Accordingly, a prolonged surge which might otherwise destroy the gas tube and/or the protected load is isolated from both the shunt protection branch and from the load thus preventing damage to both.

9 Claims, 1 Drawing Figure

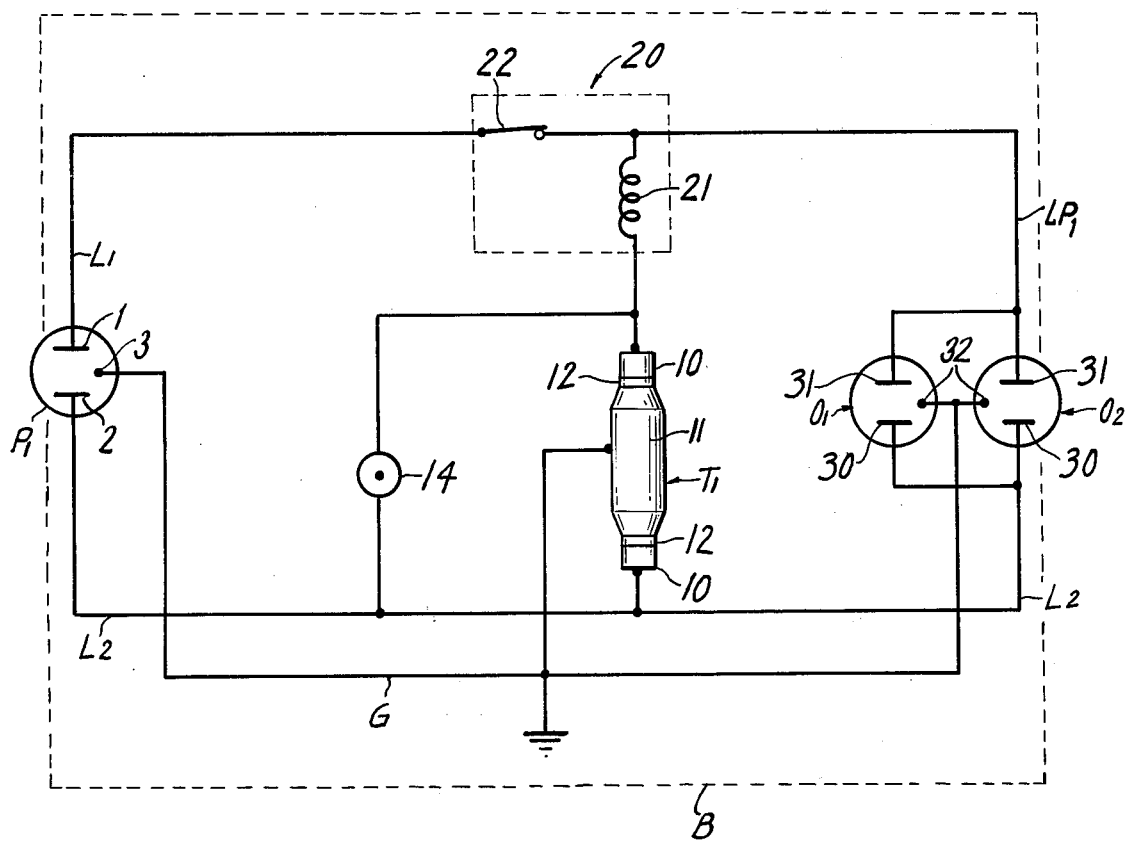

OVERVOLTAGE PROTECTOR

BACKGROUND

This invention relates to circuit protecting devices and particularly those which employ gas filled tubes which ionize in the presence of excessive voltage conditions thus acting as low impedance shunts to protect the equipment constituting the load.

A power line application of this type of circuit protection which has been developed by the applicant provides a shunt protection circuit across the load, the protection circuit comprising the series combination of a three element gas tube and a thermal circuit breaker.

For short duration surges the normally-closed thermal breaker switch is inactive while the overvoltage tube functions in conventional manner to short-circuit the effects of the transient surge.

In the event of a prolonged surge, the thermal breaker switch opens thereby disconnecting the gas tube from the lines and the load. This arrangement offers potential improvements over prior art power line protectors employing thermal breakers connected in series between the source and the parallel combination of gas tube and load circuit.

However, while the function of the shunt thermal breaker prevents burnout of the gas tube, it leaves the equipment unprotected until the thermal breaker resets.

One proposal for dealing with this particular condition is to include a fuse in the power line in series between the source and the load so that an excessive current condition occurring after the thermal breaker opens will cause the fuse to open thus preventing equipment burnout. Of course, the fuse burnout necessitates human intervention to restore normal conditions. Furthermore, some difficulties have been experienced with this arrangement in that occasionally the fuse opens during those transient conditions which are properly bypassed by the gas tube. As a consequence the load becomes disconnected from the line notwithstanding the shunt protection circuit is fully operable.

OBJECTS

It is an object of the invention to overcome the aforementioned difficulties and to provide an efficient, economical and reliable protector which protects the load during short term overvoltage conditions and which also protects both the load and the overvoltage tube during sustained overvoltage conditions.

SUMMARY OF THE INVENTION

Other objects and advantages of the invention will be apparent in the description which follows and in the practice of the invention which may generally be summarized as:

A protector circuit for protecting equipment and equipment protectors from both short term and long term overvoltage surges comprising:
1. input terminals adapted to be energized from a source of power;
2. output terminals adapted to supply power to the equipment to be protected;
3. a protection branch connected in shunt relationship with said output terminals and including:
   a. a gas tube overvoltage protector, and
   b. actuating means responsive to the current flow in said gas tube;
4. switching means coupled to said actuating means to be directly driven thereby, and connected to one of said input and one of said output terminals to permit isolation of said protection circuit from said input terminals in the event of a sustained overvoltage condition, and to restore operative connections in the event of cessation of said condition.

DETAILED DESCRIPTION

Serving to illustrate an exemplary embodiment of the invention is the drawing comprising a schematic diagram illustrating the invention applied to power line protection.

The illustrated embodiment is particularly useful as a self-contained power outlet box B having a plug $P_1$ which is plugged into the available wall outlet and having duplex outlets $O_1$ and $O_2$ which provide protected receptacles for the connection of equipment to be protected.

Plug $P_1$ has the usual line and ground connector prongs 1, 2 and 3 adapted for insertion in a power outlet and connected to respective power leads $L_1$ and $L_2$ and ground lead G. Power lead $P_2$ is connected in turn to the line contacts 30 of the output receptacles $O_1$ and $O_2$ while the input line $L_1$ is connected to contacts 31 of the output connectors via series switch 22 of a thermal circuit breaker 20 and output lead $LP_1$. Ground lead G is also connected at the outlets $O_1$, $O_2$ and particularly to the ground terminals 32 thereof.

Connected across output terminals 30, 31 is the series combination of heat coil 21 of thermal breaker 22 and the three element gas tube $T_1$ having one end electrode 10 connected to the heat unit 21, the other end electrode 10 connected to input-output line $L_2$ and the center body 11 connected to the ground line G.

Gas tube $T_1$ is of known configuration and includes insulated spacers 12 which electrically isolate the end electrodes 10 from the grounded casing 11.

Providing an indication that switch 22 is closed and that gas tube $T_1$ is deenergized is an indicator 14, illustratively a neon lamp, which is energized except when either: (a) protector $T_1$ is ionized producing essentially a short circuit between terminals 10—10 (and also to ground), or (b) when switch 22 is open, during which condition there is no voltage across $T_1$, nor across indicator 14.

By way of further description of the illustrated embodiment, the following exemplary component specifications are supplied:

Tube $T_1$: TII Model 317A
Thermal breaker 20: Klixon #7854-17-3
 (heater resistance 0.35 ± 0.05 Ω)
 (bimetal trip 15A ± 1.5A at 25° C)

In operation, short term surges cause tube $T_1$ to ionize thus shunting excessive currents through the heat element 21 and tube $T_1$ to thereby protect the equipment connected to the output receptacles $O_1$ and $O_2$.

In the event of a sustained overvoltage condition, e.g. 2 to 3 cycles, the heating element 21 produces sufficient heat to actuate the thermal switch 22. When this occurs both the protection circuit 21, $T_1$ and the protected circuit 30–31 are disconnected from the source and thus protected from the effects of such a sustained or prolonged surge.

After a period of time, e.g. 20–30 seconds, the temperature of the thermal breaker drops sufficiently to cause the reclosure of switch 22 thereby reconnecting the load and the protection circuit to the source.

Should the excessive voltage condition still exist, the previously described cycle will be repeated again lifting the gas tube and the load from the malfunctioning source.

What is claimed is:

1. A protector circuit for protecting equipment protectors from both short term and long term overvoltage surges comprising:
   1. input terminals adapted to be energized from a source of power;
   2. output terminals adapted to supply power to the equipment to be protected;
   3. a protection branch connected in shunt relationship with said output terminals and including:
      a. a gas tube overvoltage protector for protection against short term overvoltage surges, and
      b. actuating means thermally responsive to the current flow in said gas tube;
   4. switching means coupled to said actuating means to be directly driven thereby, and connected between one of said input terminals and said protection branch to permit isolation of said protection branch and said output terminals from said input terminals in the event of a sustained overvoltage condition, and to restore operative connections in the event of cessation of said condition.

2. The protector circuit defined in claim 1 wherein said gas tube overvoltage protector and actuating means are connected in series.

3. A protector circuit as defined in claim 1 in which said actuating means include a heating element thermally coupled to said switching means.

4. A protector circuit as defined in claim 1 in which said gas tube overvoltage protector is of the three electrode type and includes a ground electrode connected to respective ground contacts of said input and output terminals.

5. A protector circuit as defined in claim 4 in which said actuating means comprise heating means thermally coupled to said switching means and serially connected to said overvoltage protector.

6. A protector circuit as defined in claim 1 in which said switching means is a bimetallic strip.

7. A protector circuit for protecting equipment and equipment protectors from both short term and long term overvoltage surges comprising:
   1. input terminals adapted to be energized from a source of power;
   2. output terminals adapted to supply power to the equipment to be protected;
   3. a series protection branch connected in shunt relationship with said output terminals and including:
      a. a gas tube overvoltage protector for protection against short term overvoltage surges, and
      b. actuating means thermally responsive to the current flow in said gas tube;
   4. switching means coupled to said actuating means to be directly driven thereby, and connected between one of said input terminals and said protection branch to permit isolation of said protector in the event of a sustained overvoltage condition, and to restore operative connections in the event of cessation of said condition.

8. A protector circuit as defined in claim 7 in which said gas tube is of the three electrode type and includes a ground electrode connected to respective ground contacts of said input and output terminals.

9. A protector circuit as defined in claim 7 in which said switching means is a bimetallic strip.

* * * * *